United States Patent [19]

Peisner

[11] 4,049,229
[45] Sept. 20, 1977

[54] HOOK
[75] Inventor: Israel Daniel Peisner, Huntington Woods, Mich.
[73] Assignee: Whitehead & Kales Company, River Rouge, Mich.
[21] Appl. No.: 699,803
[22] Filed: June 25, 1976
[51] Int. Cl.² .................................................. B60P 7/08
[52] U.S. Cl. ................................ 248/503; 24/265 CD; 105/368 T; 280/179 A
[58] Field of Search ................... 248/503, 119 R, 499; 105/368 T, 482, 473, 478, 466, 475, 476, 477, 481, 479; 280/179 A; 24/265 CC, 265 CD, 221 R, 221 K, 221 L; 85/5 P

[56] References Cited
U.S. PATENT DOCUMENTS

| 1,044,590 | 11/1912 | Stewart | 24/221 R |
|---|---|---|---|
| 2,609,761 | 9/1952 | Clark | 105/478 |
| 2,736,272 | 2/1956 | Elsner | 24/265 CD X |
| 3,241,501 | 3/1966 | Watts | 105/482 |
| 3,709,455 | 1/1973 | Last | 105/473 |
| 3,854,424 | 12/1974 | Blunden | 105/368 T |
| 3,860,263 | 1/1975 | Taylor | 105/368 T |

Primary Examiner—J. Franklin Foss
Attorney, Agent, or Firm—Whittemore, Hulbert & Belknap

[57] ABSTRACT

A hook structure which forms part of a device for tying down motor vehicles upon vehicle transports such as railroad cars, trailers, and the like. The hook structure is capable of being inserted through an elongated slot in the frame of a motor vehicle and comprises a body having means at opposite edges for the attachment of two chains. A bolt is rotatably connected to the body and terminates in an elongated cross-head. The bolt is capable of being inserted head first into the slot and retained therein when turned 90°. The bolt has a square shank portion under the head which normally engages the slot to prevent rotation. The bolt shank has a circular portion more remote from the head to permit the bolt to be rotated when inserted farther into the slot.

2 Claims, 4 Drawing Figures

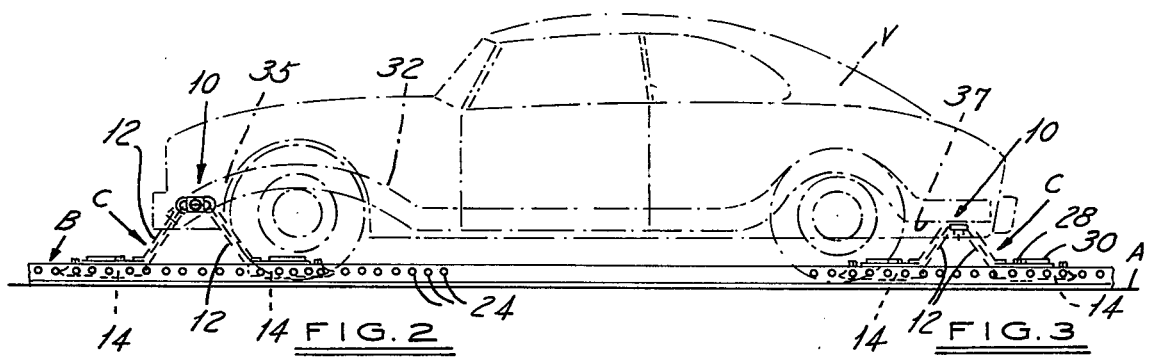
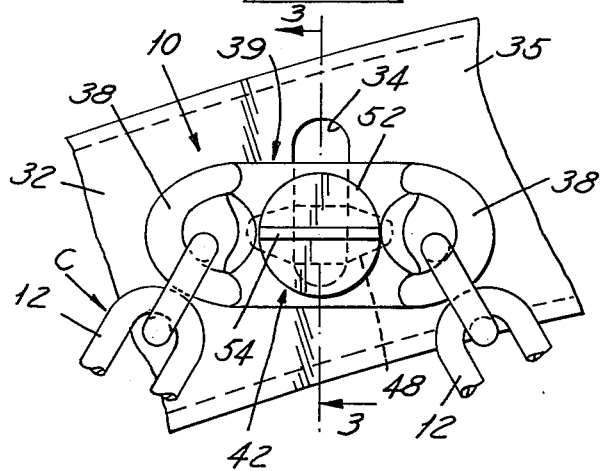
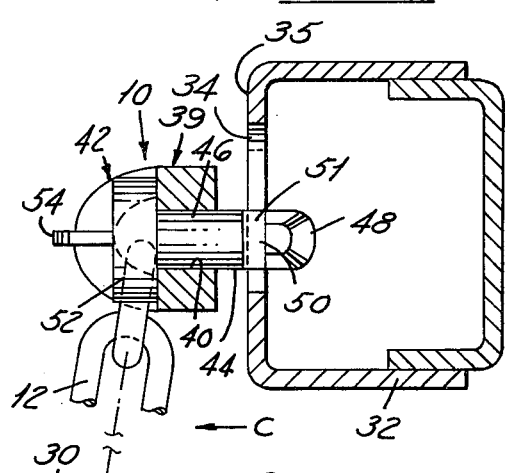
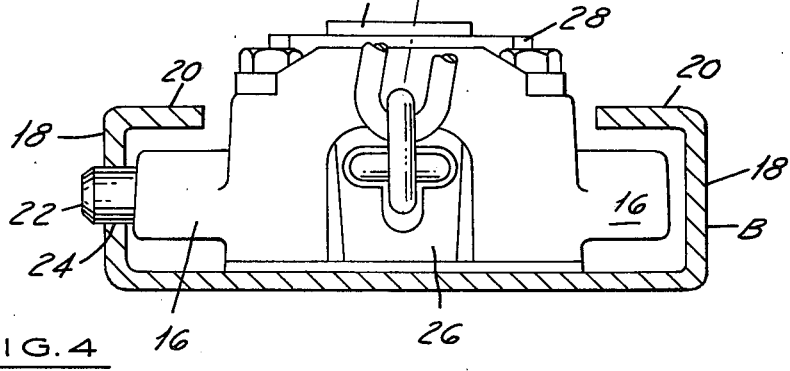
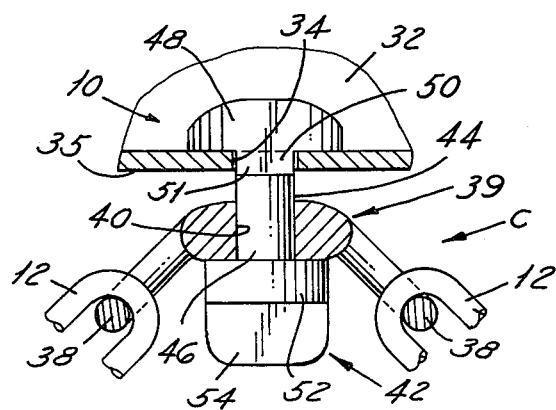

HOOK

BACKGROUND AND SUMMARY OF THE INVENTION

This invention relates generally to devices for tying down motor vehicles upon vehicle transports, such as railroad cars, trailers, and the like, and refers more particularly to an improved hook structure capable of being inserted through a suitable slot in an anchorage member forming a part of or attached to the chassis frame of a motor vehicle to be tied down.

Until recently, each tie down device has had a single chain connected by a hook to the anchorage member of the motor vehicle to hold the motor vehicle from movement in one direction, either forwardly or rearwardly. The hook will be pulled in only one direction by the single chain connected to it.

Now, however, tie down devices are being developed which have two chains per hook, one chain slanting forwardly and the other slanting rearwardly. Each such tie down device will hold the motor vehicle against both forward and rearward movement. In such tie down devices, the hook will be pulled one way and then the other as the tension shifts from chain to chain.

One of the principal objects of this invention is to provide a hook which will be secure in the slot in the anchorage member, no matter which of the two chains is in tension. Other objects and features of the invention will become more apparent as the description proceeds, especially when considered with the accompanying drawing wherein:

FIG. 1 is a side elevational view showing a motor vehicle being tied down on the deck of a vehicle transport by tie down devices having hook structure constructed in accordance with my invention, the motor vehicle being shown in dotted lines;

FIG. 2 is an enlarged fragmentary detail of a portion of FIG. 1 showing the hook structure of one of the tie down devices engaged in an anchorage member on the motor vehicle;

FIG. 3 is a sectional view taken on the line 3—3 in FIG. 2; and

FIG. 4 is a sectional view showing the hook structure engaged in the anchorage member as seen from above in FIG. 3. FIG. 4 may also be considered as an enlarged fragmentary detail of the hook structure of the rear tie down device shown in FIG. 1.

Referring now more particularly to the drawing, A is a longitudinally extending, elongated, substantially flat, horizontal deck of a transport, such, for example, as a railroad flat car, B is a stationary main supporting channel or rail secured to and extending lengthwise of the deck, and C are tie down devices for tying down a motor vehicle V.

The tie down devices C are identical. Each comprises a hook structure 10, a pair of flexible linear tensioning elements, here shown as being in the form of chains 12, attached to the hook structure, and a pair of carriages 14 disposed in the channel B and respectively attached to the ends of the two chains. Actually, a single carriage could be employed instead of two, with both chains attached to it.

The carriages in themselves form no part of the invention and may be of any suitable construction. In the present instance, and as seen in FIGS. 1 and 3, each carriage may have laterally outwardly extending bosses 16. The side walls 18 of the channel are formed with horizontal in-turned flanges 20 which overlie the bosses to prevent the carriages from lifting out. Each carriage also has a horizontal transversely disposed axially slidable locking pin 22 engageable in any one of the series of openings 24 in one of the side walls of the rail by means of which the carriage may be locked in longitudinally adjusted position. Each carriage also has a vertical shaft 26 upon which the end of a chain is wrapped. The top of the shaft has a ratchet gear 28, and pawl 30 is provided for locking the shaft against rotation to hold the chain under tension. Reference is made to U.S. Pat. No. 3,673,969 for a more detailed description of the carriage.

The hook structure 10 is adapted to be inserted through an elongated opening or slot 34 in an anchorage member 32 forming a part of or attached to the chassis frame of the motor vehicle V. The hook structure of the tie down device for the front of the vehicle is shown engaging a slot 34 in the outboard vertical wall 35 of the anchorage member 32. The hook structure of the tie down device for the rear of the vehicle is shown engaging a slot 34 in the bottom horizontal wall 37 of the anchorage member. The slot in the anchorage member at the rear of the motor vehicle may extend either transversely of the motor vehicle or longitudinally thereof. In most instances, it is desired that this slot extend longitudinally rather than transversely so as not to excessively weaken the anchorage member.

The hook structure 10 comprises an elongated rigid body 39 having an integral circular loop or eye 38 at each end in which the end link of one of the chains 12 is engaged. The eyes 38 may, if desired, extend at an angle to the plane of the central portion of the body, as seen in FIG. 4. The body has a central hole 40 of uniform circular cross section. The relationship of the hole 40 to the eyes 38 in this instance is such that a plane normal to and extending through the centers of the two eyes contains the central axis of the hole.

The hook structure also includes a bolt 42 which is rotatably connected to and projects laterally from the body. More specifically, the bolt has a shank 44 provided with a portion 46 of uniform circular cross section of substantially the same size and shape as the hole 40 in the body in which it is rotatably received. The body 39 can therefore swivel or rotate on the bolt. The circular portion 46 is of a length greater than the thickness of the body so that the shank can slide axially in hole 40. The shank terminates at one end in an integral elongated, rectangular cross head 48 which extends across the end of the shank at a right angle thereto. The cross head 48 has a length which is greater than and a width which is less than the width of slot 34. The head 48 has a length which may be less than but preferably is slightly greater than the length of the slot. The bolt is insertable head first into the slot when the head is disposed lengthwise of the slot, and then is turned 90°, as in FIGS. 2 and 4, to dispose the head crosswise of the slot. If the head 48 is longer than the slot, as it is in the present instance, the bolt may be inserted head first by tilting the bolt slightly with the head lengthwise of the slot, inserting one end of the head through the slot, moving the bolt lengthwise of the slot until the shank contacts the end of the slot, and then rocking the bolt about the slot end as a fulcrum until the other end of the head passes through the slot. A longer head is preferred because when the bolt head is turned crosswise of the slot, a greater length of head will be in bearing contact with the wall 35 or 37.